Feb. 5, 1924. 1,482,903
W. R. MORGAN
MACHINE TOOL AND METHOD OF MANUFACTURING NUTS AND THE LIKE
Filed July 24, 1922 2 Sheets-Sheet 1
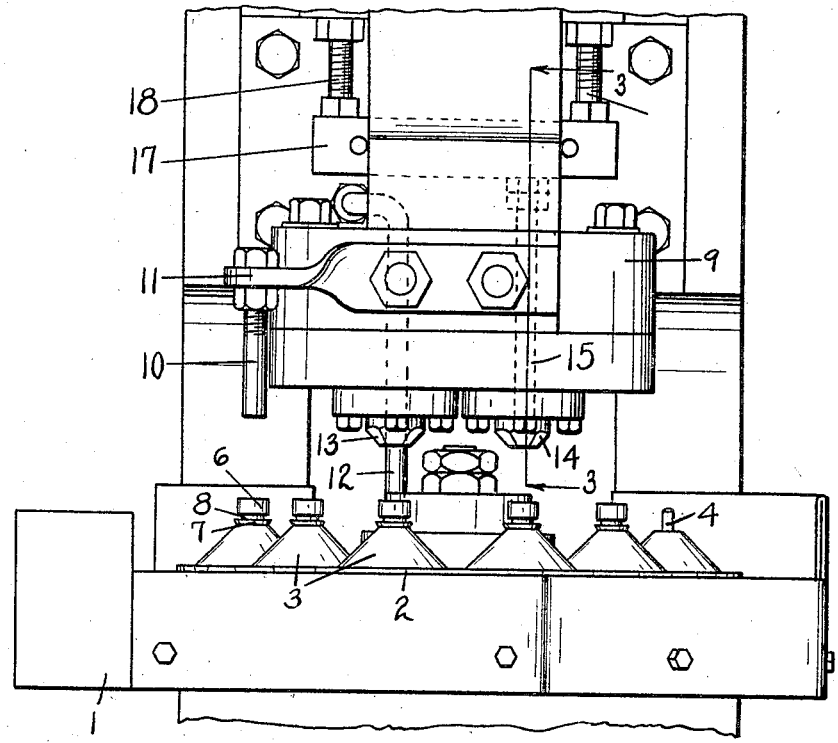
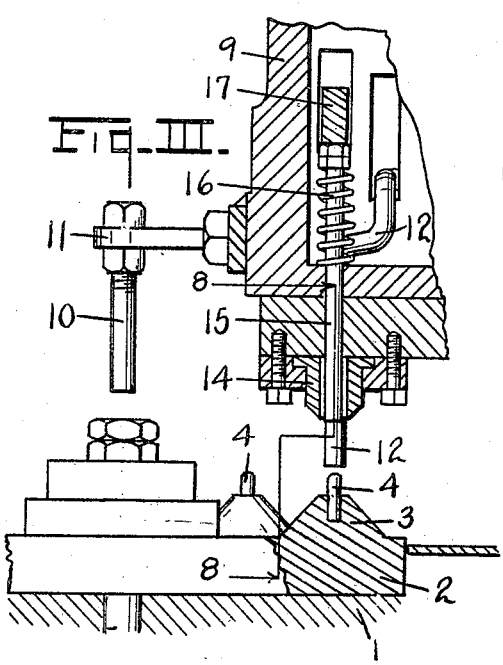
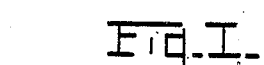
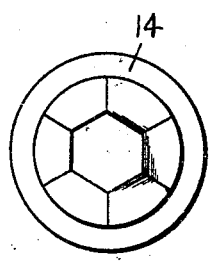
INVENTOR.
William R. Morgan
BY Chappell & Earl
ATTORNEYS

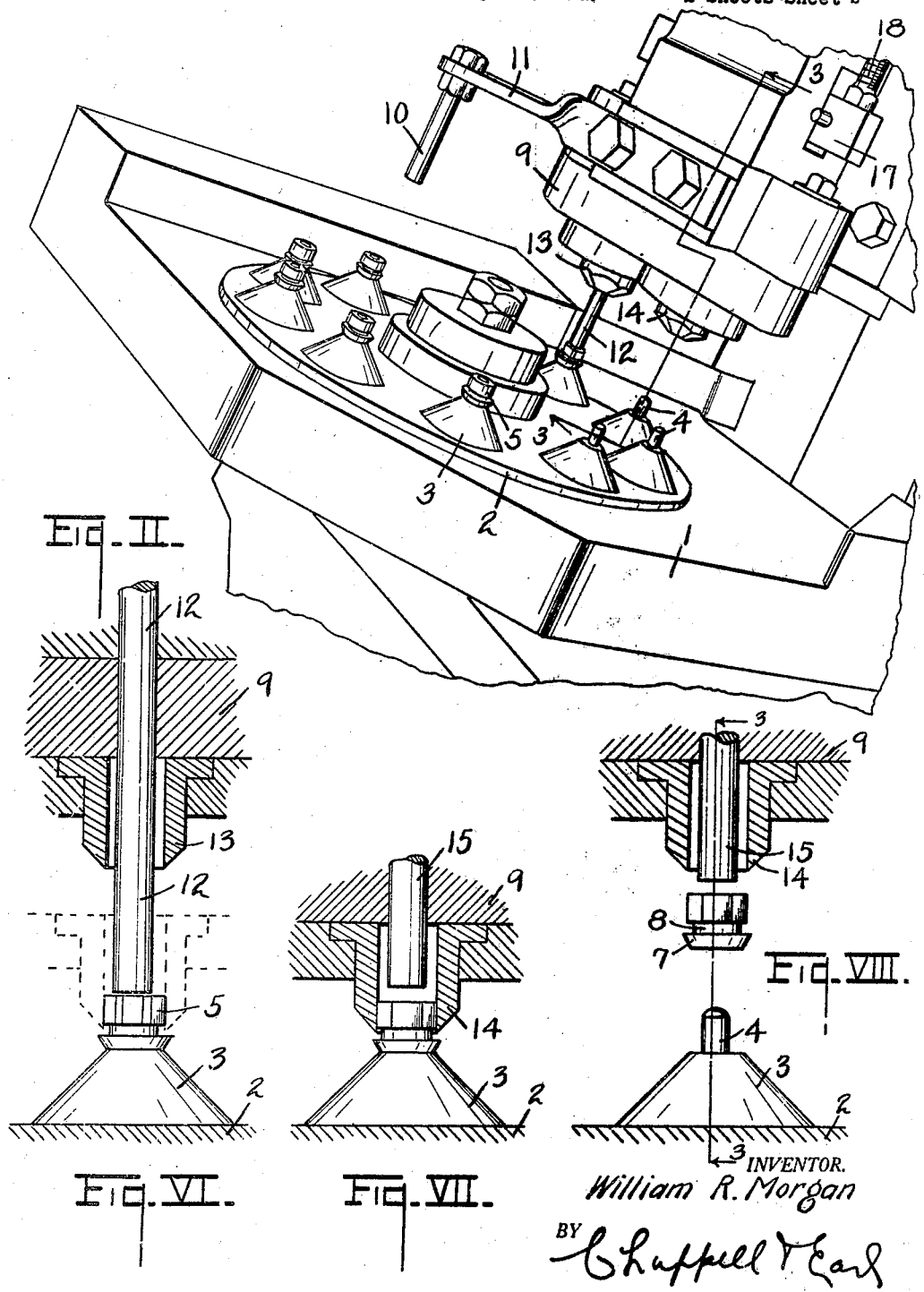

Patented Feb. 5, 1924.

1,482,903

UNITED STATES PATENT OFFICE.

WILLIAM R. MORGAN, OF JACKSON, MICHIGAN.

MACHINE TOOL AND METHOD OF MANUFACTURING NUTS AND THE LIKE.

Application filed July 24, 1922. Serial No. 577,140.

*To all whom it may concern:*

Be it known that I, WILLIAM R. MORGAN, a citizen of the United States, residing at the city and county of Jackson, State of Michigan, have invented certain new and useful Improvements in Machine Tools and Methods of Manufacturing Nuts and the like, of which the following is a specification.

This invention relates to improvements in machine tools and method of manufacturing nuts and the like.

The main objects of the invention are:

First, to provide an improved machine tool adapted for manufacturing articles such as nuts of the flanged type, bolts having heads flattened on one or more edges and numerous other articles.

Second, to provide a machine of the character described which is very simple and economical in its parts and of large capacity.

Third, to provide an improved method of manufacturing flanged nuts.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a front elevation of a machine, in manufacturing flanged nuts embodying the features of my invention, the power mechanism and the pedestal being broken away.

Fig. II is a fragmentary perspective view of the structure shown in Fig. I.

Fig. III is a detail partially in vertical section on a line corresponding to line 3—3 of Figs. I, II and VIII.

Fig. IV is an end view of the roughing cutter or broach.

Fig. V is an end view of the finishing cutter or broach.

Fig. VI is a fragmentary view partially in vertical section showing the roughing cutter in its retracted position by full lines and in its actuated position by dotted lines.

Fig. VII is a detail vertical section showing the finishing cutter in its actuated position.

Fig. VIII is a detail vertical section on a line corresponding to line 8—8 of Fig. III, showing the finishing cutter in its retracting position and as discharging the work.

In the drawing similar reference characters refer to similar parts throughout the several views and the sectional views are taken looking in the direction of the little arrows at the ends of the section lines.

Referring to the drawing, the bed 1 of the machine supports the rotary table 2 which is actuated by a step by step movement, the actuating means, however, for the table not being illustrated, as it forms no part of my present invention.

The table is provided with a plurality of annularly disposed work holders 3 having projecting studs 4 so that the nut blanks 5 may be arranged thereon. These nut blanks are formed with a cylindrical portion 6 at one end and a flange 7 at the other, a groove 8 of substantial depth being formed between the flange and the cylindrical portion. The studs 4 of the work holders are adapted to receive the blanks with the flange downward. The blanks may be effectively formed on an automatic screw machine or otherwise as desired. They are, in the structure illustrated, placed upon the studs of the work holders by hand. The means for reciprocating the plunger head 9 is also omitted as suitable mechanism for this purpose is well-known. The plunger head and table are operated in proper time or synchronism, the table being advanced when the plunger head is moving to or in its retracted position.

On the plunger is an arm 11 carrying a tappet 10 which on the reciprocation of the plunger is adapted to engage the nut blank in the event that it is not fully set or another holder pushing it down or fully seating it on the holder prior to the nut reaching the first cutter. The stripper 12 is provided to prevent the withdrawal of the work from the holders on the retraction of the roughing cutter. The stripper 12 is mounted on the frame of the machine so that the roughing cutter reciprocates longitudinally of the stripper.

After the work is acted upon by the roughing cutter it is advanced to be acted upon by the finishing cutter 14. A stripper or knock-off 15 is provided to coact with this cutter 14, the work being picked up from the work holder by the cutter and ejected or knocked out of the cutter as indicated in Fig. VIII. The stripper or knock-out 15 is normally retracted by the spring 16, so that on the downward movement of the plunger the knock-out recedes as is indicated in Fig. VII. On the return or upward movement of the plunger the stripper 15 comes into contact with the bar 17 which is adjustably supported as by means of the bolts 18, so that the work is knocked off or ejected from the cutter.

With the aid of my improved machine hexagon flanged nuts may be readily and economically manufactured, my improvements being readily adapted to punch presses of types in quite general use, although, of course, special designs of machines may be constructed if desired. All that is required of the operator is to place the blanks upon the work holders, the other operations being entirely automatic, and there is no occasion for the hands of the operator to come into dangerous proximity to the cutters and seating tappet.

I have illustrated and described my improvements in an embodiment of my machine tool which I have found very practical for the manufacture of flanged nuts. My improvements may, however, be readily adapted to the manufacture of other articles; for instance, bolts having heads flattened on one or more sides, the modification required being principally in the matter of the tool holder and the shape of the cutter. I have not attempted to illustrate or describe these embodiments and adaptations which I contemplate as I believe the disclosure made will enable those skilled in the art to which my invention relates to embody or adapt the same as may be desired.

Having thus described my invention, what I claim as new and desire to secure by Letters Patent is:

1. In a structure of the class described, the combination with a frame, of a reciprocating plunger head, a rotary work table, a plurality of work holders disposed annularly on said table and having studs adapted to receive the work, a work seating tappet on said plunger head, roughing and finishing cutters mounted on said plunger head, said tappet and roughing and finishing cutters being mounted so that they act successively on the work as it is advanced by said table with a step by step movement, a stripper mounted on said frame and disposed through said roughing cutter to prevent the withdrawal of the work from the holder on the retracting movement of the roughing cutter, a stripper movably mounted on said head for longitudinal movement relative to said finishing cutter, a tappet for said stripper, and a spring acting to normally retract said stripper.

2. In a structure of the class described, the combination with a frame, of a reciprocating plunger head, a rotary work table, a plurality of work holders disposed annularly on said table and having studs adapted to receive the work, roughing and finishing cutters mounted on said plunger head, said cutters being mounted so that they act successively on the work as it is advanced by said table with a step by step movement, a stripper mounted on said frame and disposed through said roughing cutter to prevent the withdrawal of the work from the holder on the retracting movement of the roughing cutter, a stripper movably mounted on said head for longitudinal movement relative to said finishing cutter, a tappet for said stripper, and a spring acting to retract said stripper.

3. In a structure of the class described, the combination with a plunger head, of a work table, a plurality of work holders on said work table having studs adapted to receive the work, a work seating tappet on said plunger head, roughing and finishing cutters mounted on said plunger head, said tappet and roughing and finishing cutters being mounted so that they act successively on the work as it is advanced by said table, a stripper coacting with said roughing cutter to prevent the withdrawal of the work from the holder on the retracting movement of the roughing cutter, and a stripper coacting with said finishing cutter for ejecting the work therefrom on the return stroke of the plunger.

4. In a structure of the class described, the combination with a plunger head, of a work table, a plurality of work holders on said work table having studs adapted to receive the work, roughing and finishing cutters mounted on said plunger head, said cutters being mounted so that they act successively on the work as it advanced by said table, a stripper coacting with said roughing cutter to prevent the withdrawal of the work from the holder on the retracting movement of the roughing cutter, and a stripper coacting with said finishing cutter for ejecting the work therefrom on the return stroke of the plunger.

5. In a structure of the class described, the combination with a plunger head, of a work table, a plurality of work holders on said work table, a work seating tappet on said plunger head, cutters mounted on said plunger head to act successively on the work as it is advanced by said table, a stripper coacting with the first cutter to prevent the withdrawal of the work from the holder on the retracting movement of the cutter, and a stripper coacting with a succeeding cutter for ejecting the work therefrom on the return stroke of the plunger.

6. In a structure of the class described, the combination with a plunger head, of a work table, a plurality of work holders on said work table, cutters mounted on said plunger head to act successively on the work as it is advanced by said table, a stripper coacting with the first cutter to prevent the withdrawal of the work from the holder on the retracting movement of the cutter, and a stripper coacting with a succeeding cutter for ejecting the work therefrom on the return stroke of the plunger.

In witness whereof I have hereunto set my hand and seal.

WILLIAM R. MORGAN. [L. S.]